G. M. EATON.
GEAR WHEEL LUBRICATION.
APPLICATION FILED JAN. 5, 1916.

1,275,004.

Patented Aug. 6, 1918.

WITNESSES:
R.G. Ridge.
W. B. Wells.

INVENTOR
George M. Eaton.
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-WHEEL LUBRICATION.

1,275,004. Specification of Letters Patent. Patented Aug. 6, 1918.

Application filed January 5, 1916. Serial No. 70,445.

*To all whom it may concern:*

Be it known that I, GEORGE M. EATON, a citizen of the United States, and a resident of Pittsburgh, in the county of Allegheny and State of Pennsylvania, have invented a new and useful Improvement in Gear-Wheel Lubrication, of which the following is a specification.

My invention relates to gear-wheel lubrication and particularly to the lubrication of gear wheels in motor systems provided with ventilated motors.

One object of my invention is to provide a gear wheel with a lubricating system that shall be economical to operate and shall preclude the entrance of foreign substances into the case which surrounds the gear wheel.

Another object of my invention is to provide a fluid seal between a gear wheel and a gear case which shall be maintained by the exhaust air from a ventilating system.

More specifically, my invention embodies a gear wheel and a gear case therefor, motors for operating the gear wheel and a ventilating system for the motors. A fluid seal, that shall preclude the exit of oil or grease from the case and the entrance of foreign substances thereto, is maintained between the stationary gear case and the rotating gear wheel by the air which serves to ventilate the motors.

Figure 1:
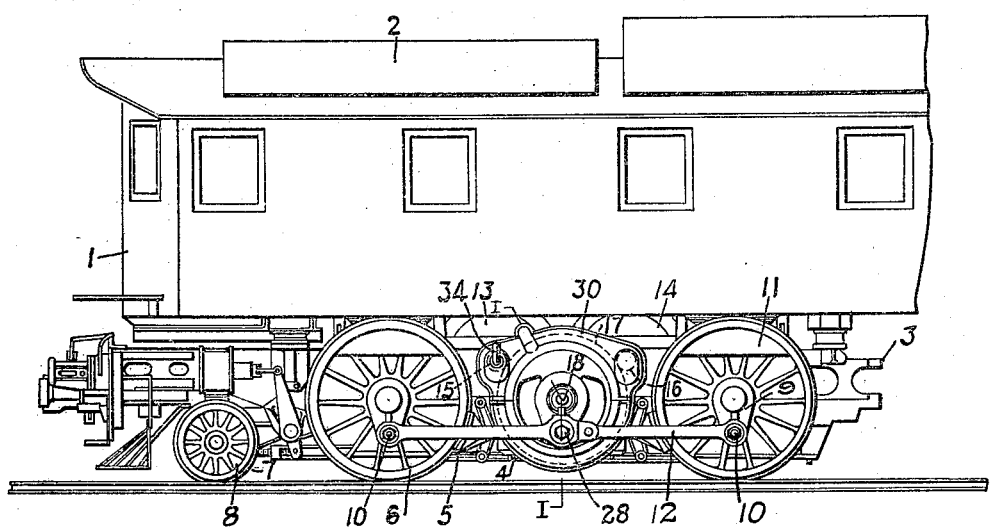
Figure 2:
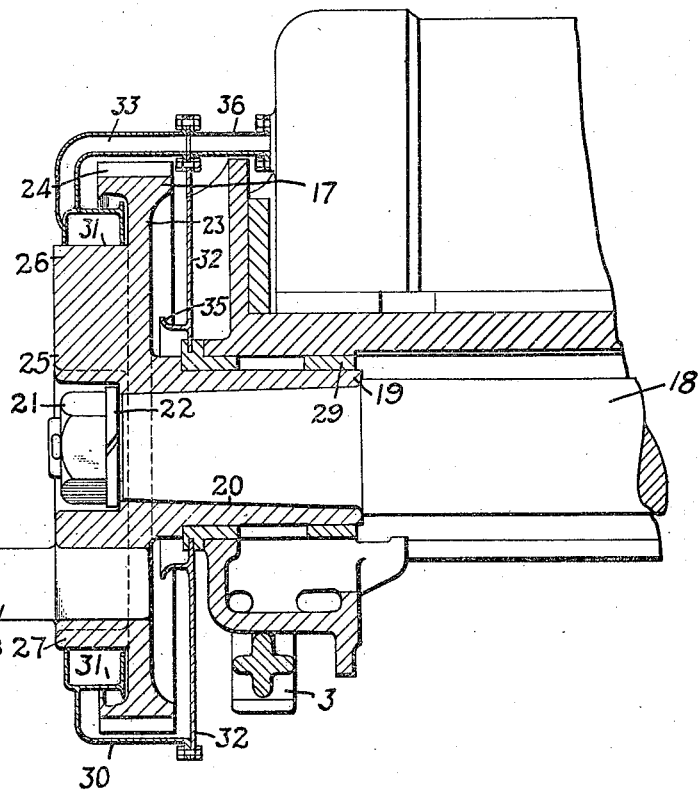

In the accompanying drawing illustrating my invention, Figure 1 is a view, in side elevation, of a portion of an electric locomotive provided with my invention, and Fig. 2 is a section along the line I—I of Fig. 1.

Referring to the drawing, a locomotive 1 is shown as embodying a cab 2, a truck frame 3 and running gears 4 (only one of which is shown). Each of the running gears embodies a four-wheel driving truck 5 provided with driving wheels 6 and a two-wheel guiding truck 7 provided with wheels 8, preferably of a lesser diameter than the driving wheels 6. Each of the driving wheels 6 of the trucks 5 is provided with a crank pin 10 which is mounted on a crank 9, and with a counter-balancing weight 11. The crank pins 10 are connected to each other by a side rod 12.

Two driving motors 13 and 14 are provided for each driving truck 5 and are disposed between the two pairs of driving wheels 6. The motors are joined by pinions 15 and 16, respectively, to a gear wheel 17 which is mounted upon a jack shaft 18.

The gear wheel 17 embodies a hub portion 19 which is mounted upon a tapered portion 20 of the jack shaft 18 and is rigidly held thereon by means of a nut 21 and a washer 22. The gear wheel further embodies a web portion 23, teeth 24, and an annular portion 25 which projects from the forward side of the web portion.

The annular portion 25 is cored to form a counter-weight 26 and a crank 27 with rim portions joining the same, the crank being disposed diametrically opposite to the counter-weight. A crank pin 28, which coöperates with the side rod 12, is mounted in the crank 27.

Brasses 29, which are mounted upon the frame 3, serve as bearings for the gear wheel 17 and the jack shaft 18.

A gear case 30, which is filled with a considerable volume of lubricant, surrounds the gear wheel 17 and the pinions 15 and 16 of the motors 13 and 14, respectively. The gear case forms a passageway 31 around the annular portion 25 and is provided with a rear shield 32, and inlet supply pipe 33 and an outlet 34 for a purpose to be described later.

The shield 32, which is annular in form, has its inside periphery sealed by one of the brasses 29, and is provided with a cylindrical projection 35. The projection 35, which has a curved cross section, as illustrated in Fig. 2, collects any lubricant that may drip from the teeth at the top of the gear wheel and carries the same around the shaft 18 so that it may drip into the bottom of the gear case without coming into contact with the bearing brasses 29.

A ventilating system 36 for the motors 13 and 14 is joined to the pipe 33 which is connected to the passageway 31 around the annular portion 25 of the gear wheel 17.

In operating the locomotive, ventilating air from the motors 13 and 14 is led by the pipe 33 to the passageway 31 and escapes through the openings between the side walls of the passageway and the periphery of the annular portion 25. The air escaping under the forward side wall of the passageway maintains a fluid seal to prevent the entrance of any foreign substance, as sand and dirt, into the gear case, and the air escaping under the rear wall of the case maintains a fluid seal to prevent the escape of any oil or grease from the gear case. Thus, the ventilating air maintains fluid seals which preclude the exit of oil or grease from the gear case and the entrance of foreign substances, as sand and dirt, into the same. The outlet 34 in the gear case serves to relieve the gear case of air pressure which may be built up by the air passing under the rear wall of the passageway 31.

Various modifications in the apparatus and improvements in the operation thereof may be effected without departing from the spirit and scope of my invention, and I desire, therefore, that only such limitations shall be imposed as are indicated in the appended claims.

I claim as my invention:

1. The combination with a rotatable member and a stationary lubricant-containing case therefor, of means for effecting a fluid seal between the member and said case comprising a fluid channel adjacent the joint between said case and said member, said channel having an annular outlet for the escape of fluid to retain the lubricant in said case and another annular outlet for the escape fluid to exclude foreign matter from said case.

2. The combination with a rotatable gear wheel and a stationary gear case for covering said gear wheel, of means for forming a fluid seal between said gear wheel and said gear case.

3. The combination with a gear wheel and a gear case therefor, of means for effecting a fluid seal between said gear wheel and said gear case to preclude the entry of foreign substances into said case and the exit of oil therefrom.

4. In a motor system having air ventilation, the combination with a gear wheel and a gear case therefor, of means for leading the ventilating air through said gear case to effect a fluid seal between said gear wheel and said gear case.

5. The combination with a gear wheel, a gear case, a motor, and a ventilating system for said motor, of means for effecting a fluid seal between said gear wheel and said gear case by air supplied from said ventilating system.

6. In an electric locomotive, the combination with a gear wheel, driving motors adapted to rotate said gear wheel, a ventilating system for said motors and a case for said gear wheel, of means for leading the ventilating air through said gear case to effect a fluid seal between said gear wheel and said gear case.

7. The combination with a gear wheel having an annular portion at one side thereof, and a gear case having a passageway around said annular portion, of means for effecting a fluid seal between said annular portion and said case.

8. The combination with a gear wheel having gear teeth, a web portion and an annular portion upon one side of said gear wheel, of a case for said gear wheel having a passageway around said annular portion, a rear shield having a cylindrical projection extending under said teeth, and means for effecting a fluid seal between said case and said annular gear portion.

9. In a locomotive, the combination with a frame, a jack shaft, a bearing for supporting said jack shaft on said frame and a gear wheel mounted on said shaft to rotate therewith and having gear teeth and a web of lesser thickness than the width of the gear teeth, of a case for said gear wheel, means for effecting a fluid seal between said case and the front of said gear wheel, and a cylindrical projection upon said case having a curved cross-section and extending under the teeth of said gear wheel to collect any oil that may drip therefrom.

10. In a locomotive, the combination with a frame, a jack shaft, a bearing for supporting said jack shaft on said frame, a gear wheel mounted on said jack shaft to rotate therewith and having gear teeth and a web of lesser thickness than the width of the gear teeth, motors for rotating said gear wheel, and a ventilating system for said motors, of a case for said gear wheel, means for effecting a seal between said bearing and said case, means for said ventilating system to effect a fluid seal between said case and the front of said gear wheel and a cylindrical projection upon said case extending under the teeth of said gear wheel to receive any oil that may fall therefrom.

11. The combination with a rotatable member and a stationary case therefor, of a motor, a ventilating system for said motor, and means for effecting a fluid seal between the rotatable member and said stationary case by fluid supplied from the ventilating system.

In testimony whereof, I have hereunto subscribed my name this 29th day of Dec. 1915.

GEORGE M. EATON.